United States Patent [19]

Krupp et al.

[11] 4,239,262
[45] Dec. 16, 1980

[54] PUMP END SWIVEL FOR HOSE

[75] Inventors: Carroll P. Krupp; Ivan T. Straga, both of Akron, Ohio

[73] Assignee: B. F. Goodrich, Akron, Ohio

[21] Appl. No.: 36,719

[22] Filed: May 7, 1979

[51] Int. Cl.³ .......................... F16L 3/16; F16L 39/04
[52] U.S. Cl. ...................... 285/61; 285/134; 285/158; 285/179; 285/282
[58] Field of Search .... 285/134, 136, 190 (U.S. only), 285/282, 61, 64, 62, 179, 158

[56] References Cited

U.S. PATENT DOCUMENTS

| 2,017,187 | 10/1935 | Steffen | 285/282 X |
| 2,153,825 | 4/1939 | Difazio | 285/61 |
| 2,913,987 | 11/1959 | Clymer | 285/282 X |
| 3,606,394 | 9/1971 | Maurer et al. | 285/134 |
| 3,709,527 | 1/1973 | Nations | 285/158 X |
| 4,008,910 | 2/1977 | Roche | 285/282 X |
| 4,090,539 | 5/1978 | Krupp | 285/134 X |

Primary Examiner—Thomas F. Callaghan
Attorney, Agent, or Firm—Joseph Januszkiewicz

[57] ABSTRACT

A pump end swivel for mounting either on the island or on the gasoline pump pedestal adjacent to the island. The swivel has a base member with an elbow assembly rotatably journaled therein. The elbow assembly has concentric inner and outer elbow members for connection to the liquid fuel and fuel vapor recovery lines of a coaxial hose. Stop means are provided to limit the rotation of the elbow assembly and the coaxial hose connected thereto relative to the base member of the pump end swivel.

15 Claims, 8 Drawing Figures

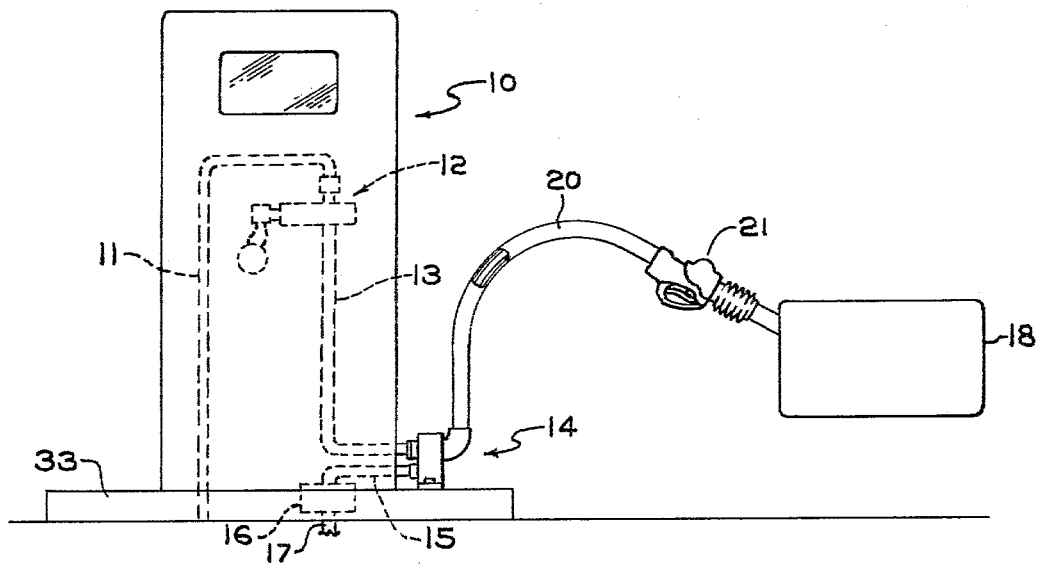
Fig. 1
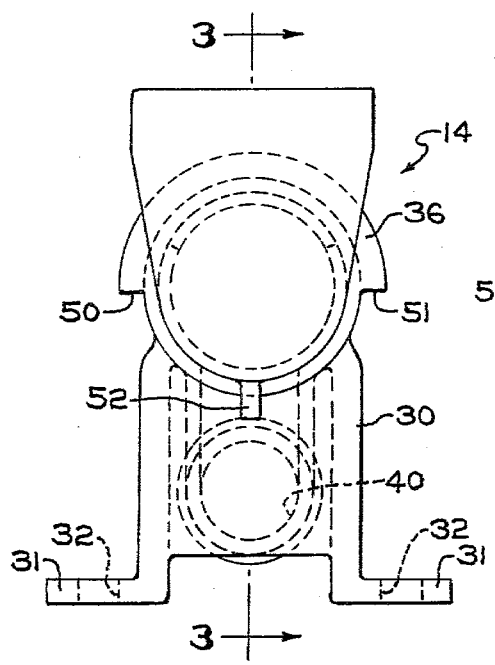
Fig. 2
Fig. 3

PUMP END SWIVEL FOR HOSE

BACKGROUND OF THE INVENTION

This invention relates to a pump end swivel for a coaxial hose and more particularly to a pump end swivel for interconnecting the gasoline dispensing hose and nozzle with the gasoline dispensing pump or pedestal which supplies the gasoline to facilitate the use of a coaxial hose to permit the inner hose to carry the liquid fuel and the outer hose to carry the displaced vapor to the gasoline dispensing pump or pedestal for collection or entrapment.

It is conventional practice to store volatile hydrocarbon fuel such as gasoline at a service station in underground reservoirs from which the gasoline is pumped into the fuel tank of a customer's vehicle. As these fuel tanks are filled with gasoline, the vaporized fuel in the vehicle tank is displaced therefrom and escapes into the surrounding atmosphere. It has been found desirable from the standpoint of preventing pollution to recover and return to the underground tanks or some appropriate vessel the volatile vapors of the gasoline during such filling operations. The present invention is directed to the use of a coaxial hose with a pump end swivel to facilitate the storage of the coiled hose in its inoperative position on the pump such that it may be readily uncoiled for use without kinking. The use of a coaxial hose as a fuel dispensing conduit as well as means for retrieving the vapors presents bulk and manueverability problems which interfere with the coiling of the hose in its inoperative position. With the use of the pump end swivel of the present invention, the coiling of the hose is facilitated for storage in a coil that is parallel to the side of the dispensing pump when pulled into position by the retriever cable of the pump hose dispenser.

The present invention's use of the approximate 180° rotation of the pump end swivel in cooperation with the fuel dispensing hose permits the hose to be deployed on either side of the gasoline dispensing pump or dispenser without twisting the hose, otherwise a twist would develop as the hose was deployed from one side of the island to the other side of the island. The present invention simplifies the use of a bulky coaxial hose by the utilization of the self-retracting feature of a hose swivel and a retriever line and the fact of the low location of the swivel on the dispensing pump and movement in a plane parallel to the side of the pump achieves a better and more efficient self-retracting hose assembly which utilizes gravity to drain any fluids that might enter the vapor return line by improper operation of the dispensing nozzle.

The present invention provides a pump end swivel for a coaxial hose to maintain separate passageways for the fuel and the vapors while allowing greater flexibility in use of the coaxial hose.

SUMMARY OF THE INVENTION

According to the present invention, a fuel hose assembly has a pair of concentric flexible hoses that are secured at one end to a pump end swivel connection while permitting the other end to be connected to a dispensing nozzle to permit greater movement between the coaxial hose and the gasoline dispensing pump or pedestal. The pump end swivel is a housing member located closely adjacent to the lowermost portion of the pump or pedestal permitting the coaxial hose to rotate in a plane parallel to the side of the pump that contains the fuel dispensing nozzle with a greater latitude of movement for positioning the dispensing nozzle into the fill opening of a vehicle tank that may be located on either side of the pump island without kinking the coaxial hose. A modification of the pump end swivel permits selective mounting on the island adjacent to the pump pedestal or on the lower portion of the pedestal adjacent to island.

BRIEF DESCRIPTION OF THE DRAWINGS

FIG. 1 is a diagrammatic view of a service station liquid fuel dispensing pump utilizing a coaxial hose and pump end swivel of the present invention.

FIG. 2 is an enlarged front elevational view of the pump end swivel.

FIG. 3 is a cross-sectional side elevational view of the pump end swivel taken on line 3—3 of FIG. 2.

DESCRIPTIONS OF THE PREFERRED EMBODIMENTS

Figure 4:
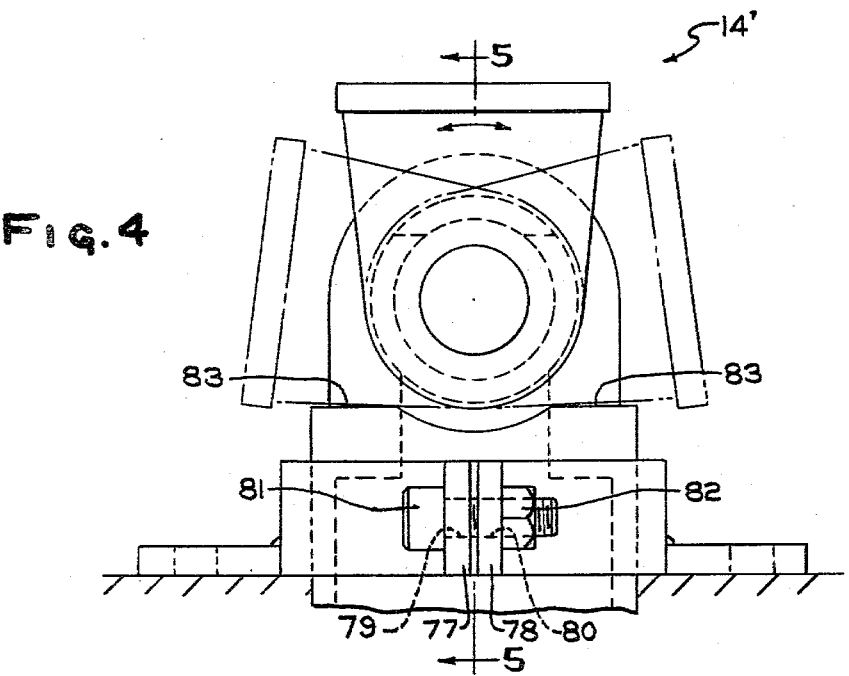
FIG. 4 is an enlarged front elevational view of a modified form of a pump end swivel.

Referring to the drawings wherein like reference numerals designate like or corresponding parts throughout the several views, there is shown in FIG. 1 a gasoline dispensing pump, dispenser or pedestal 10.

An underground tank (not shown) for storing liquid fuel such as gasoline is located closely adjacent to the pedestal 10 and is operative as by a suitable pump means disposed in such storage tank to pump gasoline through a conduit 11 to a control unit or metering means 12 for conveyance via conduit 13 to a pump end swivel 14. A second conduit 15 interconnects a second portion of the pump end swivel 14 to be described to a vapor trap 16 located within pedestal 10. Vapor trap 16 in turn is connected via a conduit 17 to either the storage tank or to a suitable vapor recovery system.

A coaxial hose 20 has one end connected to the pump end swivel 14 and the other end connected to a fuel pump nozzle 21 described in detail in U.S. Pat. Nos. 3,653,415, 3,811,486 and 3,866,636, the disclosures of which are hereby incorporated by reference. The pump means in the gasoline storage tank pumps the gasoline up conduit 11, through the control unit or metering means 12, and thence via conduit 13 to the pump end swivel 14 where it is directed to the inner hose of the coaxial hose 20 for dispensing through fuel pump nozzle 21 into a vehicle receptable 18.

The pump-end swivel 14 has an inverted U-shaped base or base member 30 with a pair of laterally extending leg portions or flanges 31–31 with holes 32 therein to facilitate the securing of such base to the concrete island 33 of a service station. Base 30 has a bore 35 that extends therethrough having an opening on the forward face 36 and an opening on the rear face 37 thereof. The wall of the bore 35 contains a hole or port 38 to communicate with a curved tubular conduit 39 that is threaded as at 40.

Journaled for rotation in bore 35 of base 30 is an elbow assembly 42. Elbow assembly 42 has an outer elbow member and an inner elbow member integral therewith. The outer elbow member has an enlarged internally threaded opening 43 at the open end, a reduced cylindrical portion 34 at the other end that extends through the rear face 37 and a curved portion therebetween. The outer elbow member of the elbow assembly 42 adjacent to the forward face 36 is reduced to be received by the bore 35 and provides a shoulder 46 to limit the movement of the elbow assembly 42 into bore 35. The outer elbow member of elbow assembly 42 has a circumferential recess on such other end to receive a snap ring 48 which secures elbow 42 in the base 30 and permits rotation of the outer elbow member in bore 35.

Base or base member 30 has a semi-circular flanged portion on face 36 presenting a pair of spaced shoulders or abutments 50 and 51. Outer elbow member of elbow assembly 42 has a projection or stop 52 machined or cast onto its lower intermediate portion as viewed in FIG. 3, such that upon rotation of the elbow 42, projection or stop 52 will abuttingly engage abutment 50 or 51 to limit the rotation of the elbow assembly 42 and the coaxial hose 20 that is connected thereto. The inner elbow member of elbow assembly 42 has as shown in FIG. 3 a vertically disposed tubular portion 44, an elbow 45 and a horizontally disposed portion 22, which portion 22 is integral with reduced end cylindrical portion 34 of the outer elbow member. The horizontal disposed portion 22 of the inner elbow member has a threaded nut 60 journaled thereon and retained thereon by a snap ring 61 received by a suitable groove. The conduit 13 is threadedly connected to the nut 60 thereby permitting the rotation of the elbow assembly 42 without impairing the threaded connection. The outer surface of horizontally disposed portion 22 of the inner elbow member 22 has a pair of groove receive O-rings 62 to provide a positive seal to prevent the passage of liquid fuel.

The clearance space between the inner elbow member of elbow assembly 42 and the outer elbow member of elbow assembly 42 defines an annular chamber or passageway 65, which chamber 65 terminates adjacent to that portion of the outer elbow member of elbow assembly 42 that joins with the inner elbow member of elbow assembly 42. The intermediate portion of the outer elbow member of elbow assembly 42 is recessed as at 66 to communicate the annular chamber 65 with the conduit 39 which in turn communicates with the conduit 15. The inner peripheral wall surface of bore 35 has a pair of spaced circumferential grooves which receive O-rings 67 and 68 to provide a seal for the annular passageway 65 to prevent the escape of vapors through such pump end swivel.

The vertically disposed tubular portion 44 of the inner elbow member of elbow assembly 42 has a pair of internal grooves 69 and 70 which receive an O-ring to prevent leakage. The coaxial hose 20 is connected to the pump end swivel 14. The coaxial hose as disclosed by FIG. 3 of U.S. Pat. No. 4,090,539 is illustrative of the type of hose to be used in cooperation with the pump end swivel 14. The material of U.S. Pat. No. 4,090,539 relative to structure of the coaxial hose and related parts is incorporated herein by reference.

Figure 5:
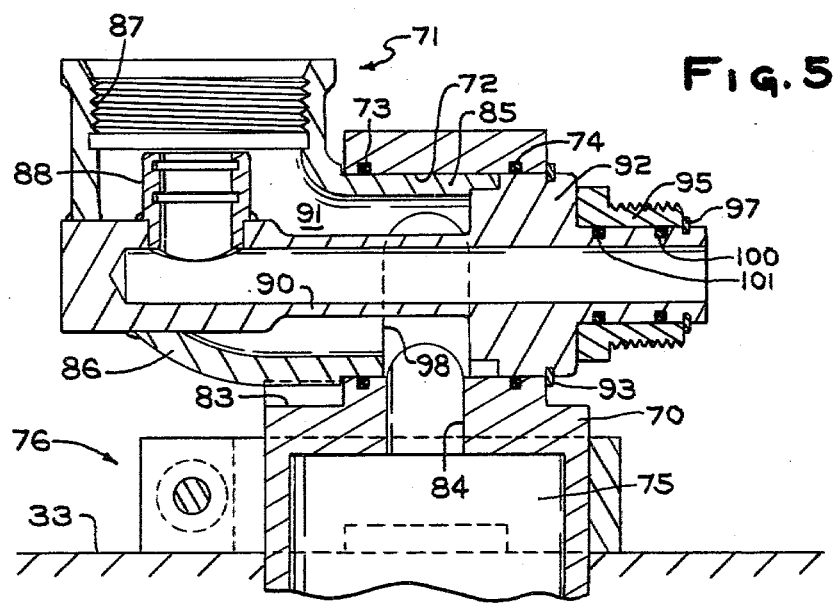
FIG. 5 is a cross-sectional side elevational view of the modified form of the pump end swivel shown in FIG. 4 taken on line 5—5 of FIG. 4.

A modification of the above disclosed and described invention of the pump end swivel is shown in FIGS. 4 and 5 wherein the pump end swivel 14' has a cylindrical base 70 and an elbow assembly 71. The cylindrical base 70 has a bore 72 extending through the upper portion thereof. The inner peripheral surface of bore 72 has a pair of spaced grooves which receive O-rings 73 and 74. The lower bottom portion of base 70 has a chamber 75 which may be connected to a pollution control system or a vapor trap. The position or location that pump end swivel 14' on the island 33 is determined by a clamp 76 which encircles the base 70. Clamp 76 is a circumferentially extending annular ring split along a vertical center line. Claim 76 has a pair of lugs 77 and 78 adjacent to such split. Each of the respective lugs 77 and 78 have bores 79 and 80 respectively receiving a threaded bolt 81 having a nut 82 threaded thereon to tighten the clamping action of the split ring clamp 76. Upon loosening of the nut 82 the cylindrical base 70 can be adjusted vertically thereof. Base 70 has a bore 84 that interconnects chamber 75 with the bore 72 for a purpose to be described. The base 70 has a pair of spaced abutments 83 which act as stops in a manner to be described.

Journaled for rotation in bore 72 is the elbow assembly 71 having an outer elbow member and an inner elbow member. The outer elbow member of elbow assembly 71 has an outer cylindrical portion 85 and an outer curved portion 86 terminating into a vertically disposed tubular portion with an internally threaded opening 87 at one end. The inner elbow member of elbow assembly 71 has a vertically disposed tubular portion 88 and a horizontally disposed tubular portion 90. Tubular portion 90 is coaxial with the cylindrical portion 85 and cooperative therewith to define an annular passageway 91. The vertically disposed or one end of tubular member 88 is suitably secured to the outer curved portion 86 as by welding or by other suitable means such as by casting as a single unit. Although the juncture of the tubular portion 88 and horizontally disposed portion 90 of inner elbow member of elbow assembly 71 is shown as substantially right angular, it may be curved or a combination thereof. Inner tubular portion 90 has an enlarged cylindrical portion 92 which is secured as by welding or by casting to the other end of elbow assembly 71. The outer circumferential surface of cylindrical portion 92 is grooved to receive snap ring 93 to retain the elbow assembly 71 within cylindrical base 70. A threaded nut 95 is journaled on the other end of tubular portion 90, which other end portion is circumferentially grooved to receive a snap ring 97 and O-rings 100 and 101.

The cylindrical portion 85 of elbow assembly 71 is slotted as at 98 to interconnect the annular passageway 91 with bore 84 and chamber 75 to direct the fuel vapors thereto.

Rotation of the outer elbow assembly 71 and tubular member 90 is limited relative to the base 70 by the abutting contact of the outer elbow of elbow assembly 71 with either of the spaced abutments 83.

Figure 6:
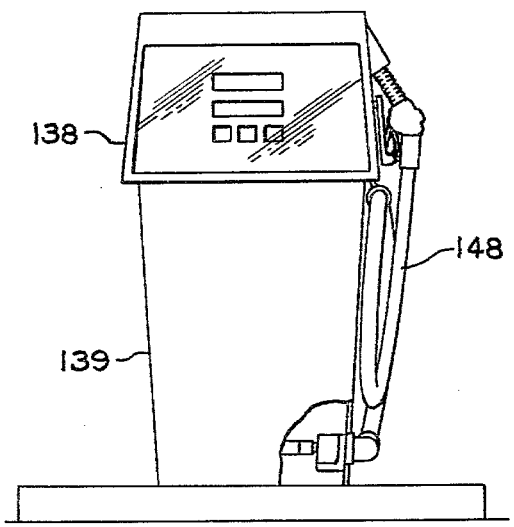
FIG. 6 is a side elevational view of a service station liquid fuel dispensing pump with a portion of the pedestal broken away to show the pump end swivel.
Figure 7:
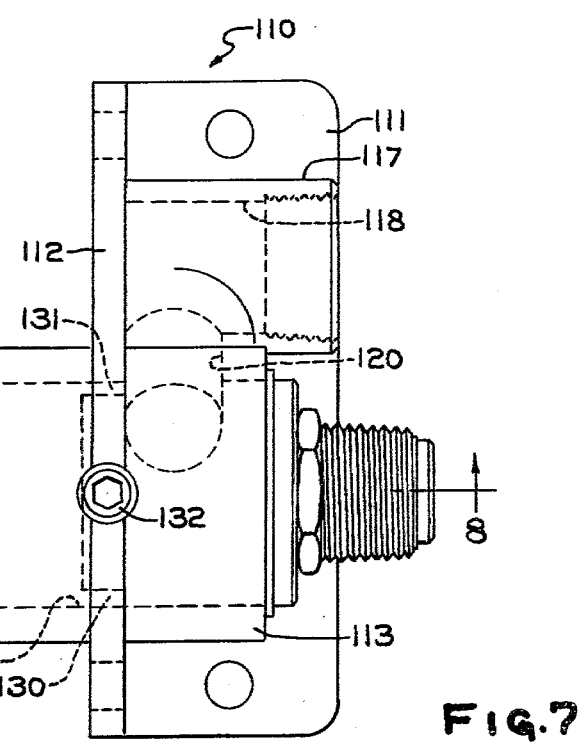
FIG. 7 is an enlarged plan view of a further modified form of a pump end swivel.
Figure 8:
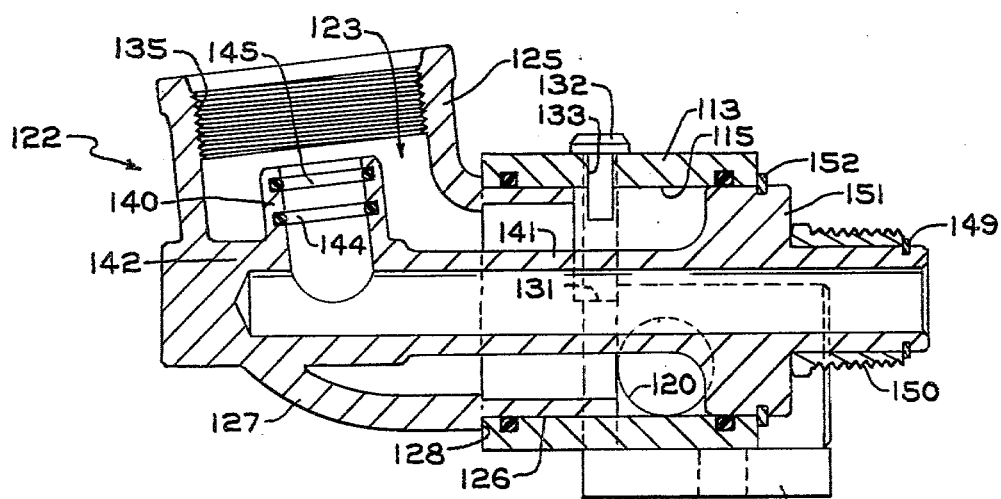
FIG. 8 is a cross-sectional side elevational view of the modified form of the pump end swivel shown in FIG. 7 taken on line 8—8 of FIG. 7.

A further modification of the above described and disclosed embodiment of the pump end swivel is shown in FIGS. 6, 7 and 8. The pump end swivel has a bracket 110 with a horizontally disposed plate portion or member 111, a vertically disposed portion or member 112 and a base member or boss 113 with a bore 115 extending therethrough. A second boss 117 parallel to base member 113 has a bore 118 extending therethrough which bore 118 communicates with bore 115 via a passageway 120. Rotatably journaled in bore 115 is an elbow assembly having an outer elbow member 122 and an inner elbow member 123 concentric therewith. Outer elbow member 122 has a pair of spaced linear tubular portions 125 and 126 with a curved portion 127 therebetween. The one linear tubular portion 126 is of a reduced diameter relative to the curved portion 127 defining an annular shoulder 128 limiting the movement of the elbow assembly into the bore 115. A portion of the very end of the one linear tubular 126 of outer elbow member 122 is recessed for a portion of its circumference to provide a pair of flat abutments 130 and 131 to limit the rotation of the elbow assembly relative to the base member 113. A pin 132 is suitably threaded into a bore 133 in the upper portion of member 112, projecting into bore 115 and is adapted to abuttingly engage abutment 130 or 131 to limit the rotation of the elbow assembly. The one linear end of outer elbow member 122 has a threaded opening 135 for connection to a coaxial hose. The opening 135 of such one end of outer elbow member 125 has its central axis making an obtuse angle with the axis of the other linear tubular portions 126 of the elbow assembly. This permits the unobstructive movement of the coaxial hose relative to the pedestal where the upper portion 138 is larger than the lower upright portion 139 as shown in FIG. 6.

The inner elbow member 123 of the elbow assembly has a pair of spaced linear tubular portions 140 and 141 with an interconnecting portion 142 that is integral with the curved portion 127 of outer elbow member 122. The one end of linear tubular portion 140 has a pair of annular recesses receiving O-ring 144 and 145 to seal the inner hose of the coaxial hose 148 that is to be attached thereto as shown generally in FIG. 6. The end of linear tubular portion 141 is recessed to receive a snap ring 149 to retain an externally threaded nut 150 that is journaled thereon. Adjacent to the described end portion of linear tubular portion 141 is an enlarged cylindrical hub portion 151 whose outer surface engages the inner periphery of bore 115 and is rotatably journaled therein. Such hub portion 151 is recessed to receive a snap ring 152 to captively rotatably secure the elbow assembly within base member 113 via annular shoulder 128 and snap ring 152.

It will be apparent that, although a specific embodiment and certain modification of the inventions have been described in detail, the invention is not limited to the specifically illustrated and described constructions since variations may be made without departing from the principles of the invention.

We claim:

1. A pump end swivel for mounting on an island adjacent to a gasoline pump, said swivel having a base member, an elbow assembly mounted in said base member for rotation about a horizontal axis in a plane parallel to the side of the pump, said elbow assembly having one end connected to a coaxial hose for dispensing liquid fuel and collecting fuel vapors, said elbow assembly having an outer elbow member integral with an inner elbow member, said outer elbow cooperative with said inner elbow to define an annular passageway for the passage of vapor, said inner elbow having a passageway for the passage of fuel, and an abutment means mounted on said elbow assembly cooperative with stop means on said base member for limiting the rotative movement of said elbow assembly relative to said base member.

2. A pump end swivel as set forth in claim 1 wherein said base member has a first bore for receiving said elbow assembly for rotation about said horizontal axis, said elbow member having an opening located in that portion of said outer elbow member that is within said bore of said base member, said base member having a conduit communicating with said opening for interconnecting said annular passageway with said conduit for the passage of fluid therethrough.

3. A pump end swivel as set forth in claim 2 wherein each of said elbow members have two spaced tubular portions connected by a connecting portion, one of said tubular portions of each elbow member is horizontally extending, the other ones of said tubular portion of each elbow member being vertically disposed, and the axis of each one of said vertically disposed tubular portions making an obtuse angle with the axis of said horizontally disposed tubular extending portions.

4. A pump end swivel as set forth in claim 2 wherein said base member has means for adjusting the vertical position thereof on said island.

5. A pump end swivel for mounting on an island for use with a gasoline pump, said swivel having a base member with a first bore extending therethrough, said base member having a pair of laterally extending flanges to facilitate the attachment of said base to an island, a curved tubular member with a passageway therein extending outwardly from said base member, said tubular member having one end threaded, the other end of said tubular member communicating with said bore of said base member, an outer elbow member having a curved portion and a cylindrical portion, said cylindrical portion of said elbow member journaled in said bore of said base member for rotation therein, said outer elbow member having an inner elbow member integral therewith and extending outwardly through said cylindrical portion, said outer elbow member cooperative with said inner elbow member to define an annular chamber, said outer elbow member being recessed for interconnecting said annular chamber with said passageway of said curved tubular member, said outwardly extending portion of said inner elbow member having an annular shoulder closely adjacent to said base member, a threaded nut journaled on said outwardly extending portion of said inner elbow member for coupling to a liquid fuel supply line for directing liquid fuel through the inner passageway of said inner elbow member.

6. A pump end swivel as set forth in claim 5 wherein said cylindrical portion of said base member has a semicircular flange in its outer surface adjacent to said outer elbow member, said semi-circular flange has a pair of spaced abutments, and said outer elbow member having an abutment for abuttingly engaging selectively said spaced abutments on rotation relative to said base member.

7. A pump end swivel for mounting on a gasoline service station island for use with a gasoline pump, said swivel having a base member with a bore extending therethrough, said base member having a conduit, one end of said conduit being threaded for connection to a vapor collection means, the other end of said conduit connected to said bore, an outer elbow member journaled in said bore for rotation, said outer elbow member having a curved portion and a linearly extending cylindrical portion, said cylindrical portion adjacent to said curved portion having a shoulder to limit the axial movement of said outer elbow member into said bore, one end of said cylindrical portion of said outer elbow member remote from said curved portion having a snap ring mounted thereon to retain said outer elbow member on said base member, an inner elbow member located in said outer elbow member and integral therewith, said inner elbow member having a curved portion and a linearly extending cylindrical portion, said cylindrical portion of said inner elbow member merging with said cylindrical portion of said outer elbow member defining an annular passageway therebetween, said merging portion of said cylindrical portions defining an annular shoulder, one end of said curved portion of said outer elbow member being concentric with one end of said curved portion of said inner elbow member to define an annular passageway therebetween that is an extension of said first mentioned annular passageway, the one end of said cylindrical portion of said inner elbow member remote from said curved portion receiving a threaded nut, and a snap ring mounted adjacent to said nut on said one end of said inner elbow member to confine said threaded nut into abutting engagement with said annular shoulder, and said cylindrical portion of said outer elbow member being recessed to interconnect said annular passageway with said conduit.

8. A pump end swivel for mounting on a gasoline service station island as set forth in claim 7 wherein said base member has a pair of spaced abutments, and said outer elbow member having an abutment operative to selectively engage said spaced abutments upon rotation in said bore.

9. A pump end swivel for use with a coaxial hose for dispensing liquid fuel to a vehicle receptacle and for passing fuel vapors therefrom comprising a base member with a bore extending therethrough, means connected thereto for attaching said base to a gasoline dispensing island, said base member having a chamber communicating with said bore through a passageway for directing fuel vapors into said chamber, an outer elbow member journaled in said bore for rotation, said outer elbow member having a curved portion and a cylindrical portion, said curved portion of said outer elbow member having one end threaded for connection to a coaxial hose, an inner elbow member mounted in said outer elbow, said inner elbow member having one end closely adjacent to said threaded end for connection to said coaxial hose, said inner elbow member having an enlarged portion for connection to the other end of said outer elbow member and for rotative engagement by said bore of said base member, and base member having a pair of spaced abutments, said outer elbow selectively engageable with one or the other of said spaced abutments, said inner elbow cooperative with said outer elbow to define an annular passageway that communicates with said chamber through said passageway, said inner elbow having the other end operative to receive a threaded nut, a snap ring on said other end of said inner elbow being operative to secure said threaded nut thereon for rotative movement only, and a snap ring on said enlarged portion being operative to retain said outer elbow member in said bore of said base member.

10. A pump end swivel for use on a pump stand pedestal, said pedestal having a plurality of generally vertically disposed walls defining a housing, said pedestal mounted on a gasoline service station island, one of said walls having an aperture therethrough closely adjacent to said island, a bracket means with a bore therethrough mounted on said one wall, said bore of said bracket being concentric with said aperture, a coaxial elbow assembly mounted on said bracket means, said elbow assembly having an outer elbow and a concentric inner elbow defining an annular passageway and an inner passageway for the passage of fuel vapors and liquid fuel, and stop means mounted on said bracket means operative to limit the rotative movement of said coaxial elbow assembly on said bracket.

11. A pump end swivel as set forth in claim 10 wherein said bracket means has a base member with a bore therethrough for journaling said coaxial elbow assembly, said outer elbow having a pair of spaced abutments in said bore of said base member, and said base member having a stop member projecting into said bore of said base member for selective engagement by one of said spaced abutments.

12. A pump end swivel as set forth in claim 11 wherein the axis of the openings of said outer elbow and said inner elbow make an acute angle with a vertical line passing through said axis of between 2 and 15 degrees.

13. A pump end swivel as set forth in claim 10 wherein said base member has a second bore parallel to said first mentioned bore in said base member, and said outer elbow being recessed to communicate said annular passageway with said second bore.

14. A pump end swivel for use on a pump stand pedestal that is mounted on a gasoline service station island, bracket means located within said pedestal for mounting therein, said bracket means having a pair of spaced planar surfaces that lie in planes that are normal to each other, each of said planar surfaces having bores therein for connecting said bracket selectively to either said pedestal or island, said bracket means having a boss with a bore extending therethrough, a coaxial elbow assembly journaled in said bore of said boss for rotation thereon, said elbow assembly having a flanged portion for abuttingly contacting said boss, said coaxial assembly having an outer elbow member and an inner elbow member, one end of said elbow members having linear axially extending portions defining an annular passageway, the other ends of said elbow members having concentric openings whose common axis forms an obtuse angle with the axis of said linear axially extending portions, said outer elbow member journaled in said bore of said boss terminating therein, said boss having a forward annular face and a rearwardly disposed annular face, said inner elbow member having an enlarged hub portion that rotatively contacts the inner periphery of said bore of said boss adjacent to said rearwardly disposed annular face, and a snap ring on said hub portion abuttingly contacting said rearwardly disposed annular face to captively secure said elbow assembly in said boss between said flange and said snap ring.

15. A pump end swivel as set forth in claim 14 wherein said outer elbow member terminates in said bore of said boss to define gap in the wall surface of said linear axially extending portion, said wall surface of said axially extending portion of said outer elbow has a pair of spaced abutments, and said boss receives a stop member that extends into said bore of said boss for selectively engaging said spaced abutments to limit the rotation of said elbow assembly relative to said boss.

* * * * *